United States Patent [19]

Skidmore

[11] Patent Number: 5,488,714

[45] Date of Patent: Jan. 30, 1996

[54] COMPUTER PROGRAM ANALYZER FOR ADAPTING COMPUTER PROGRAMS TO DIFFERENT ARCHITECTURES

[75] Inventor: Wendy C. Skidmore, Wayne, Pa.

[73] Assignee: Unisys Corporation, Blue Bell, Pa.

[21] Appl. No.: 112,631

[22] Filed: Aug. 25, 1993

Related U.S. Application Data

[63] Continuation of Ser. No. 955,226, Oct. 1, 1992, abandoned, which is a continuation of Ser. No. 527,059, May 23, 1990, abandoned.

[51] Int. Cl.$^6$ ....................................... G06F 3/00
[52] U.S. Cl. .................... 395/500; 395/54; 364/274.5; 364/DIG. 1
[58] Field of Search ....................... 395/800, 700, 395/600, 50, 54, 500; 364/274.5, DIG. 1

[56] References Cited

U.S. PATENT DOCUMENTS

| | | | |
|---|---|---|---|
| 4,533,997 | 8/1985 | Furgerson | 364/200 |
| 4,667,290 | 5/1987 | Goss et al. | 395/700 |
| 4,803,641 | 2/1989 | Hardy et al. | 395/76 |
| 4,935,876 | 6/1990 | Hanatsuka | 364/DIG. 1 |
| 4,974,191 | 11/1990 | Amirghodsi et al. | 364/900 |
| 5,021,992 | 6/1991 | Kondo | 364/DIG. 2 |
| 5,127,104 | 6/1992 | Dennis | 395/650 |
| 5,142,469 | 8/1992 | Weisenborn | 364/146 |
| 5,159,687 | 10/1992 | Richburg | 395/700 |
| 5,241,678 | 8/1993 | Fitamura et al. | 395/700 |

OTHER PUBLICATIONS

Kurod et al., "A Knowledge–Based Retargetable Compiler for Application Specific Signal Processors," 1989 IEEE International Symposium on Circuits and Systems, Feb. 1989, pp. 631–634.

Banning, "The XDOS Binary Code Conversion System," 34th IEEE Computer Society International Conference, Feb. 27–Mar. 3, 1989, pp. 282–287.

*IEEE 1987 National Aerospace & Electronic Conference*, "Automatic Translation of Assembly Language Software", by Lawler, pp. 729–731.

*Primary Examiner*—Alyssa H. Bowler
*Assistant Examiner*—John Harrity
*Attorney, Agent, or Firm*—Robert R. Axenfeld; Mark T. Starr

[57] ABSTRACT

An extended mode analyzer (EMA) processes source code modules, detects suspicious instruction patterns and produces recommendations for code modification. The EMA applies knowledge based technology to the problem of massive source code conversion. The knowledge base component within the EMA models any given source code module using a hierarchical class/attribute structure. All source lines occurring in a given module are partitioned into homogenous classes characterized by function or instruction type. Higher level programming concepts are abstracted from lower level implementation details by drawing correspondences between class members which constitute instruction sequences related by common elements. When inferencing begins, the existence of class members meeting certain criteria trigger events which change the state of the world as seen by the knowledge base, in turn triggering other state changing events and so on until a state of equilibrium is achieved. The end result of this process is the body of recommendations produced by EMA for source code conversion.

12 Claims, 10 Drawing Sheets

COMPUTER PROGRAM ANALYZER FOR ADAPTING COMPUTER PROGRAMS TO DIFFERENT ARCHITECTURES

This is a continuation of application Ser. No. 07/955,226 filed on Oct. 1, 1992, now abandoned, which is a continuation of application Ser. No. 07/527,059 filed on May 23, 1990, now abandoned.

BACKGROUND OF THE INVENTION

1. Field of the Invention

The present invention generally relates to a computer software tool for increasing productivity in software conversion tasks. In a specific example, the software tool is used to adapt an operating system for use in an extended address space architecture. More particularly, the invention is a knowledge based software tool which analyzes source code and produces detailed recommendations for code changes necessary to preserve program functionality while running on a different computer architecture than that for which the code was originally written.

2. Description of the Prior Art

Computer hardware, from microcomputers to mainframes, is rapidly evolving, providing increased processing speed and memory. This, however, creates a problem for software developers who are having an increasingly difficult time in adapting software to the new computer architectures. Even within a so-called family of computers where the architecture of the new generation of computers has been designed to maintain a certain degree of compatibility with the prior generation, there is often a major task in adapting computer programs to the new architecture.

Consider, for example, the case where a new generation of computer architecture allows extended memory addressing capability. A case in point is a new generation Unisys computer which supports a 64 MByte memory environment, in contrast to the older Unisys System 80 computer which supports only a 16 MByte memory environment. The problem presented by this new architecture was to adapt the operating system, OS3, which was written in assembly language for the System 80 to the new 64 MByte memory environment. This is a monumental task because of the thousands of lines of source code of the program that must be analyzed and, where required, modified.

The problem is not limited to operating systems which are to be ported to a new computer architecture, nor is the problem unique to mainframe computers. As a specific example in the microcomputer field, consider the Intel 80286 microprocessor which has two modes of operation; a real mode, corresponding to the 1 MByte memory addressing capabilities of the older Intel 8086 microprocessor, and a protected mode, allowing addressing capabilities of 16 MBytes. A very popular microcomputer application program is Lotus 1-2-3™, which is an electronic spreadsheet originally written in assembly language for the 8086 microprocessor. The task of converting this program to extended memory addressing capabilities of the 80286 microprocessor considerably delayed the introduction of the program to this new memory environment.

SUMMARY OF THE INVENTION

It is therefore an object of the present invention to provide an efficient software tool to aid programmers in modifying source code to enable a computer program to run on a different computer hardware architecture than the architecture for which it was originally written.

It is another object of the invention to provide a software tool that provides expert advice to programmers on the modification of source code for use in an extended address space architecture.

According to the present invention, an extended mode analyzer (EMA) is provided which processes source code modules, detects suspicious instruction patterns and produces recommendations for code modification in a fraction of the time it would ordinarily take a team of programmers to perform the same task. The EMA is a novel application of knowledge based technology to the problem of massive source code conversion. The knowledge base component within the EMA models any given source code module using a hierarchical class/attribute structure. All source lines occurring in a given module are partitioned into homogenous classes characterized by function or instruction type. Correspondences are drawn between class members which constitute instruction sequences related by common elements. When inferencing begins, the existence of class members meeting certain criteria trigger events which change the state of the world as seen by the knowledge base, in turn triggering other state charging events and so on until a state of equilibrium is achieved. The end result of this process is the body of recommendations produced by EMA for source code conversion.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The preferred embodiment and best mode for the practice of the invention is in the environment of OS3, the Unisys System 80 operating system, which is being ported to a new Unisys platform. The new platform supports a 64 MByte memory, in contrast to the 16 MByte memory supported by the System 80. The OS/3 operating system consists of approximately 6000 assembly language modules, each of which must be examined and possibly re-coded due to the larger 64 MByte conversion.

The extended mode analyzer (EMA) according to the invention is a knowledge based software tool which analyzes OS/3 code modules and produces detailed recommendations for code modifications based on the 64 MByte conversion requirements. The EMA was written in the Knowledge Engineering System (KES) environment, a commercially available expert system development tool. KES provides an English-like language for the definition of class structures and rules, plus an inferencing mechanism which controls the way in which rules are applied to case specific information stored in the knowledge base class structures. Although the analyzer has been implemented in KES, it will be understood by those skilled in the art that the application could be implemented using any other expert system tool providing the basic capabilities for knowledge representation and inferencing.

The EMA system operates on a Unisys U5000/50 platform under the UNIX™ (trademark of AT&T) operation system. OS/3 modules are transferred over a data communications link from the System 80 to the U5000/50 where they are processed by the EMA. A UNIX™ shell script controls the cycle of the parsing, analyzing and report generating for each OS/3 module. The final report for each processed module can be scanned at the terminal or sent to a printer for the programmer's inspection.

While the preferred embodiment of the invention has been implemented in the OS/3 environment, those skilled in the art will understand that the teachings of the invention may be applied to other environments and are not limited to Unisys architectures or even operating systems. For example, assembly language application programs written for real memory mode operation in some microprocessors could be analyzed by the EMA to make recommendations for code modifications for running the application programs in protected memory mode of those microprocessors. Other examples will suggest themselves from the following detailed description of the preferred embodiment.

Figure 1:
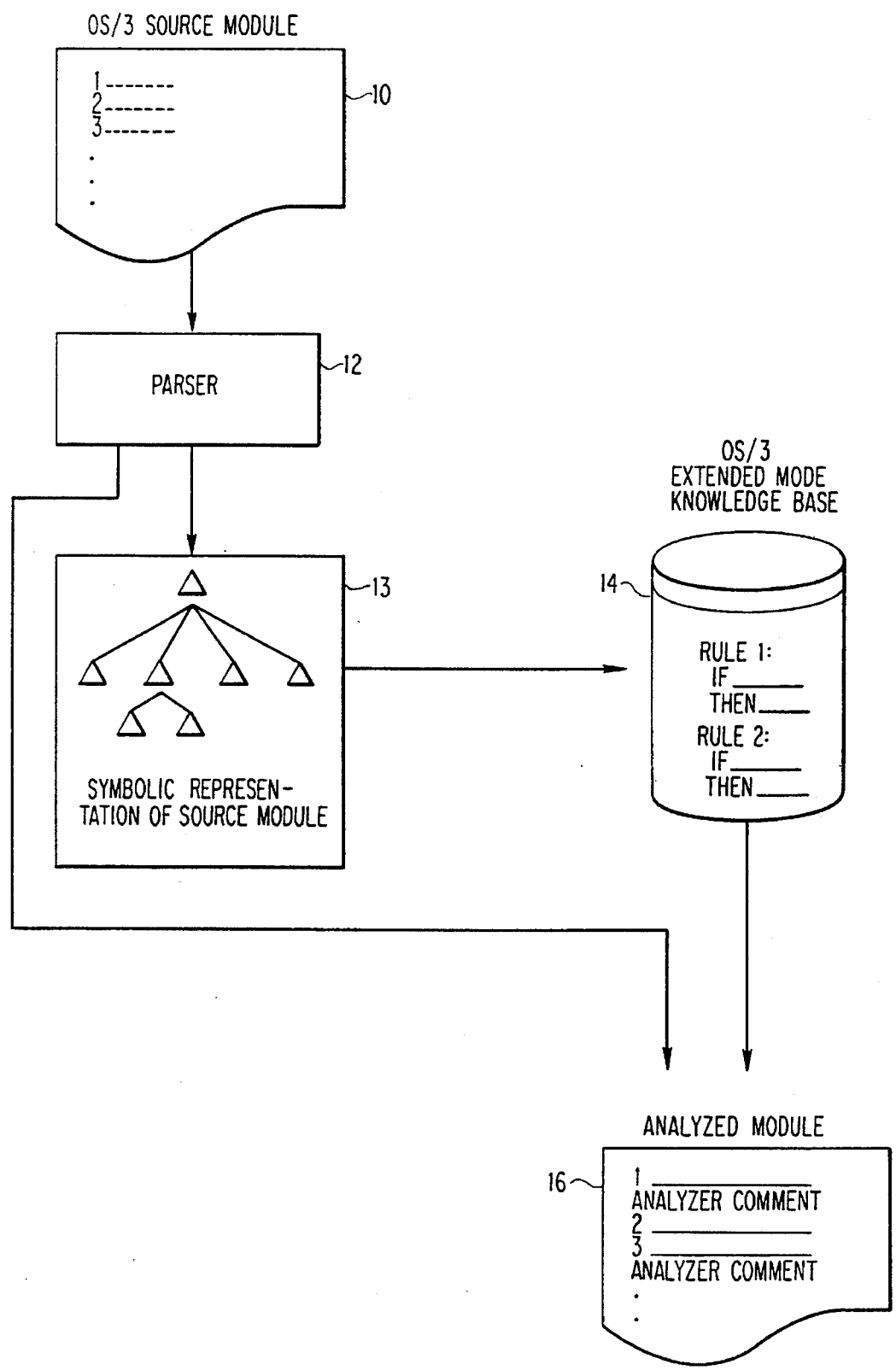
FIG. 1 is a block diagram providing a general overview of the extended mode analyzer according to the invention.

Referring now to the drawings, and more particularly to FIG. 1, there is shown the transformation process of an OS/3 module from its original source form into its final analyzed form. OS/3 modules at 10 are first processed by a C language parser 12 which passes symbolic information 13 on to the system's knowledge base component 14 where instruction patterns are detected and analyzed. Additional output from the parser 12, together with output from the knowledge base component 14, is combined by the output integration process to produce the final recommendation file 16 for each module. The EMA is designed to operate either in interactive mode where a single module at a time is analyzed, or in batch mode where a single command from the user spawns the processes which parse, analyze and create recommendations files for multiple source code modules.

Figure 2:
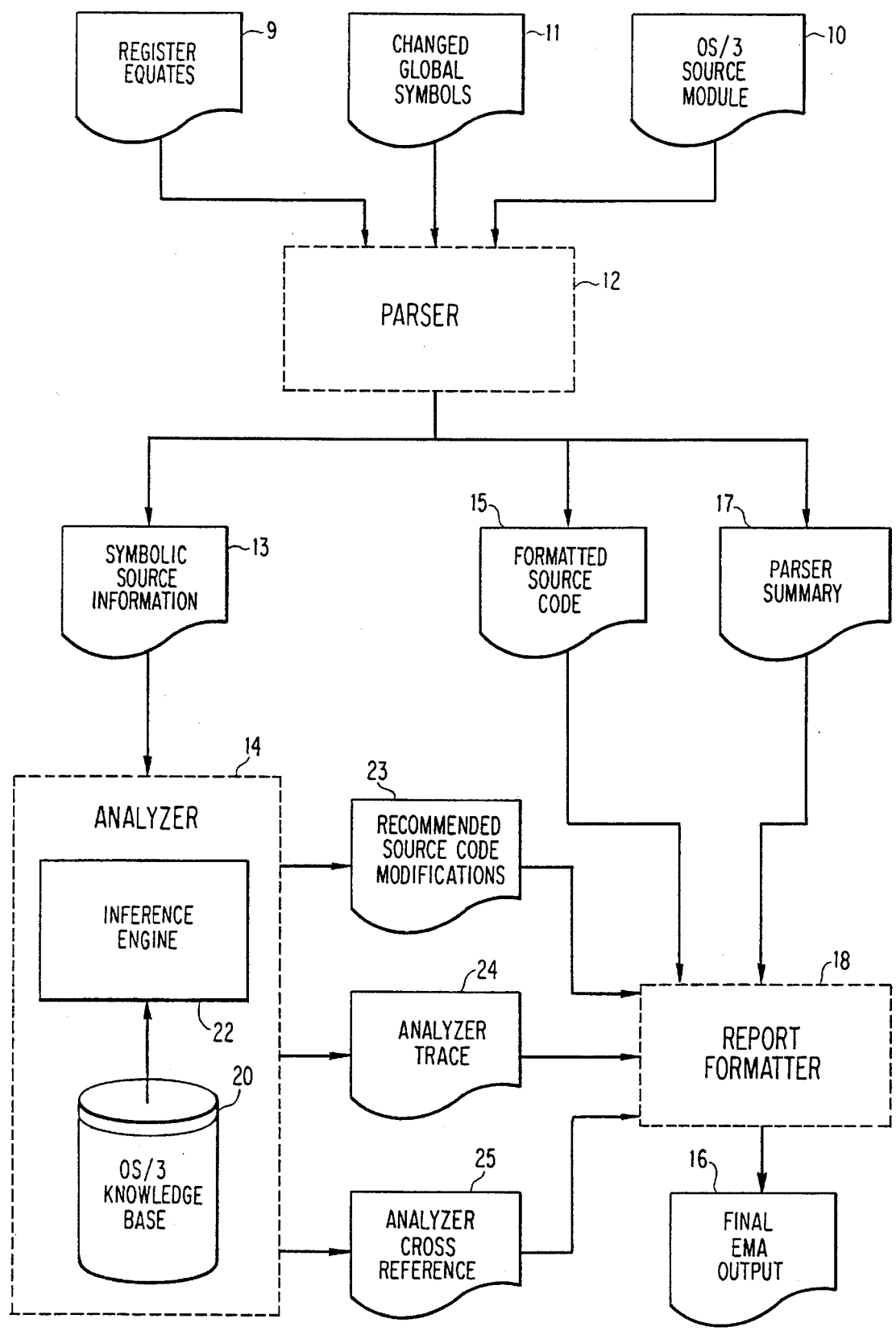
FIG. 2 a block diagram showing in more detail the extended mode analyzer system according to the invention.

The EMA system, as illustrated in FIG. 2, consists of three major program components: the parser 12, the analyzer 14 and the report formatter 18. As mentioned, the parser 12 is a C language program that translates OS/3 source code into symbolic representation 13 which is meaningful to the analyzer 14. In addition to the OS/3 source modules, the parser 12 receives as inputs an equivalence list 9 of registers and a list 11 of changed global symbols for the two architectures. In addition to the symbolic source information 13, the parser 12 also produces a formatted version 15 of source code for the given module and a summary 17 of parser messages for that module which are later used by the report formatter 18.

The analyzer 14 consists of the knowledge base 20 and inference engine 22 components. All knowledge of OS/3 and details concerning the 64 MByte conversion reside in the knowledge base 20. OS/3 knowledge exists in the form of classification hierarchies which are designed to store the symbolic information produced by the parser 12. These structures give representation to and logically connect all entities in a given OS/3 source module such as instructions, registers and program data. Knowledge of the 64 MByte conversion requirements exists in a group of rules which embody the facts and guidelines one would apply in converting OS/3 source code to the 64 MByte platform.

The inference engine 22 is a program that controls the way in which knowledge base rules are applied. In the case of EMA, the inference engine applies conversion rules to the module-specific information stored in the classification hierarchies in order to draw a conclusion. The output of the inferencing process is 1) a list 23 of recommended code changes for the given module, 2) a trace 24 of the rules used in arriving at these recommendations and 3) a cross reference 25 of all symbol names used on source lines which have been cited for change.

The report formatter 18 integrates the source code 15 and summary 17 output by the parser 12 and the recommended source code modifications 23, the analyzer trace 24 and the analyzer cross reference 25 output by the analyzer 14 to produce the final EMA report 16. This report is used by OS/3 programmers as a guide in making actual source code changes.

OS/3 source code is stored in classification hierarchies which give representation to and logically connect all entities in a given source module 10. The details of the OS/3 conversion problem drive the design of the classification hierarchies which group instructions based on the type of functions they perform. Source lines are effectively partitioned into classes by their functionality or instruction type providing a foundation from which higher level programming concepts can be abstracted. These classification hierarchies can be tailored to provide a representation of source code written in any programming language.

EMA represents conversion knowledge in rules which are triggered by information contained in the classification hierarchies. Each rule corresponds to a programming concept which can be achieved by certain combinations of instructions. Examples of programming concepts identified in OS/3 code are 1) loading the address of a global data structure into a register followed by a clear of the high order byte, and 2) moving two bytes of data from memory into a register and using the data in the register as an address to access other data stored in memory. The programming concepts identified by EMA rules are those which need to be re-implemented for the extended memory platform. While these rules are specific to OS/3 conversion, the abstraction of higher level concepts from these lower level implementation details is a notion which is independent of language or platform. The set of programming concepts one chooses to extract will be determined by the nature and scope of the conversion problem under consideration.

For purposes of code conversion, the difference between the System 80 platform and the new platform is in the amount of addressable memory; 16 MBytes versus 64 MBytes. System 80 memory locations are referenced by a 24-bit address, while addresses on the new platform are 26-bit addresses. The word size in both machines is 32 bits, or 4 bytes. Registers on both machines are also 4 bytes. OS/3 source code was written to accommodate the 24-bit address size on the System 80 and, as written, will not run in the 64 MByte environment. The OS/3 assembler has been modified for the 64 MByte platform in order to accommodate the extended address format. This means that source code running on the new platform will be interpreted differently than the identical source code running on the System 80 platform.

One example of an assembler change for the new platform is the interpretation of the load address (LA) instruction. On the System 80, the instruction "LA Rx,0(,Rx)" causes the contents of the register Rx to be loaded back into Rx, setting the first eight bits of the register to zero. This instruction is commonly used to clear irrelevant data from the top byte of the register after the register has been loaded with address data. On the new platform, the same form of the LA instruction causes the contents of the register Rx to be loaded back into Rx, setting only the first six bits of the register to zero. The new interpretation leaves the last twenty-six bits intact to accommodate the longer address.

If the LA instruction is used in OS/3 code to clear the top byte of a register regardless of the data stored in the lower three bytes, the execution of the same instruction on the new platform will produce undesirable results. The new assembler will clear bits 0–5 leaving data in bits 6 and 7 which may cause a program error. The problem is the use of an address dependent instruction (LA) to perform an address independent function (clearing the top byte of a register) where the instruction is interpreted differently by the new assembler to accommodate the longer address format. LA instructions of this form must be examined in context for data dependency. Those which appear to manipulate non-address data should be replaced by a different instruction which will clear the top byte of a register on the new platform just as the programmer had intended on the System 80.

Since OS/3 was written for System 80 hardware, much of the code takes advantage of the old 24-bit address limit by retrieving, storing and passing address data in 24-bit (3-byte) units. Another coding practice contingent on the 3-byte address limit is the use of the top byte of a word (the eight bits beyond the twenty-four required for storing an address) for passing flags or other program information when address data is stored in the lower three bytes. On the 64 MByte platform, these partial word addressing techniques are no longer valid.

Instructions which manipulate data in three byte units can be easily identified, but not all instructions manipulating data in units of this size necessarily deal with address data. It is perfectly valid to manipulate non-address data in three byte units, and these instructions must remain intact to preserve the existing functionality of the OS/3 code. One of the problems then in converting OS/3 to the 64 MByte environment is determining which instructions manipulate address data and which do not. Since address data and non-address data can be manipulated in the identical fashion, the distinction between the two events is not immediately obvious from the instructions alone.

Prior knowledge of a module's functionality and reference to in-line comments are both valuable aids in recognizing the manipulation of address versus non-address data. In the absence of either of these aids, an experienced OS/3 programmer can infer from program context if an instruction manipulates a memory address or some other type of program data. Contextual clues used by OS/3 programmers are stored as rules in the EMA knowledge base 14. These rules are based on sequences of instructions which a programmer knows are indicative of 24-bit addressing. Three factors complicate the job of scanning manually for instruction sequences: 1) individual instructions making up a sequence are not necessarily adjacent in the code making the pattern difficult to detect, 2) intervening instructions must be examined as they may negate the function of an otherwise adjacent sequence of instructions, and 3) instruction sequences may overlap so that a single instruction belongs to more than one sequence. To complicate matters further, each sequence carries its own rules regarding negation by intervening instructions, and sequences may overlap in such a way that one or more sequences are negated.

While each of these problems is tractable on an individual basis, the complexity involved in scanning even a single source module of 1000 lines with overlapping and nonadjacent sequences can be overwhelming. Knowledge base rules exist to detect sequences of adjacent and nonadjacent instructions, to evaluate the effect of intervening instructions on each sequence of nonadjacent instructions, and to identify overlapping sequences which have common instructions. The following are examples of four separate instruction sequences which might be found in OS/3 code. These instructions indicate that the variables A, B, C, and D are most likely being used to store 24-bit address data:

```
Sequence 1         SR    R1,R1
                   ICM   R1,3,A
                   SLL   R1,8
Sequence 2         L     R1,B
                   SLL   R1,8
                   SRL   R1,8
Sequence 3         SRL   R1,8
                   STH   R1,C
Sequence 4         LH    R3,C
                   STH   R3,D
```

In the following code segments, the lines marked S1, S2, S3, and S4 belong to sequences 1, 2, 3, and 4, respectively:

```
S1      XR    R1,R2      S2      L     R1,B
S1      ICM   R1,3,A     S1      XR    R1,R1
S2      L     R1,B       S1      ICM   R1,3,A
S1,S2   SLL   R1,8       S4      LH    R3,C
S4      LH    R3,C       S1,S2   SLL   R1,8
S2,S3   SRL   R1,8       S2,S3   SRL   R1,8
S4      STH   R3,D       S4      STH   R3,D
S3      STH   R1,C       S3      STH   R1,C
```

If the four sequences are interleaved in the manner shown on the left, the function accomplished by each sequence in its consecutive form is negated by intervening instructions. If, however, they are interleaved in the manner shown on the right, sequences 1 and 3 achieve their original functions, while sequences 2 and 4 do not. Rules in the knowledge base distinguish between occurrences of nonadjacent, overlapping sequences such as the ones on the left which require no modification, and those on the right for which code modifications are necessary.

On the System 80, certain data structures which are global to all OS/3 modules have traditionally been stored in a low area of memory such that a structures's address fits into just two bytes. Some of these structures are being relocated to higher memory on the new platform (i.e., their addresses are expanding from two to four bytes) so that half word addressing is no longer valid. Addresses of global data structures are equated to well known symbol names which are accessible to all OS/3 modules. Because the low address range of these structures is well known, it is common throughout OS/3 code to store these symbol values in two bytes of a register or into a local variable which is knowingly treated by the programmer as a half word.

All occurrences of half word addressing in OS/3 code must be identified and changed. In some modules, a relocated structure is accessed by its symbol name providing a way to trace the propagation of its value to registers and local variables. Any instruction manipulating such a register or variable can then be examined for addressing violations.

In other modules, a relocated structure is accessed through a register which has been loaded with the structure address by a previously executed module. When values are passed in this way, the symbol name never appears in the code making it impossible to detect addressing violations through symbol propagation. In this case, knowledge base rules sensitive to half word data manipulation use the same types of contextual clues mentioned above to distinguish between the manipulation of address versus non-address data. These rules generate recommendations for code conversion for instructions which appear to manipulate half word address data.

The main components in the OS/3 knowledge base 14 are class structures and rules. Collectively, the class structures provide a symbolic framework in which any given source code module can be represented. Knowledge base rules (technically called demons) embody the knowledge used to identify source lines which must be modified for the extended address platform.

The class structures defined in the knowledge base remain constant from one execution to the next, while the members of a class vary with each OS/3 module analyzed. All source lines in a module are treated as members of the class "CODE", which has an associated set of attributes representing all characteristics of a single OS/3 source line. Every member of the class takes on a unique value for each of the attributes, much like every record in a data base takes on its own value for each field associated with a data base table.

Figure 3:
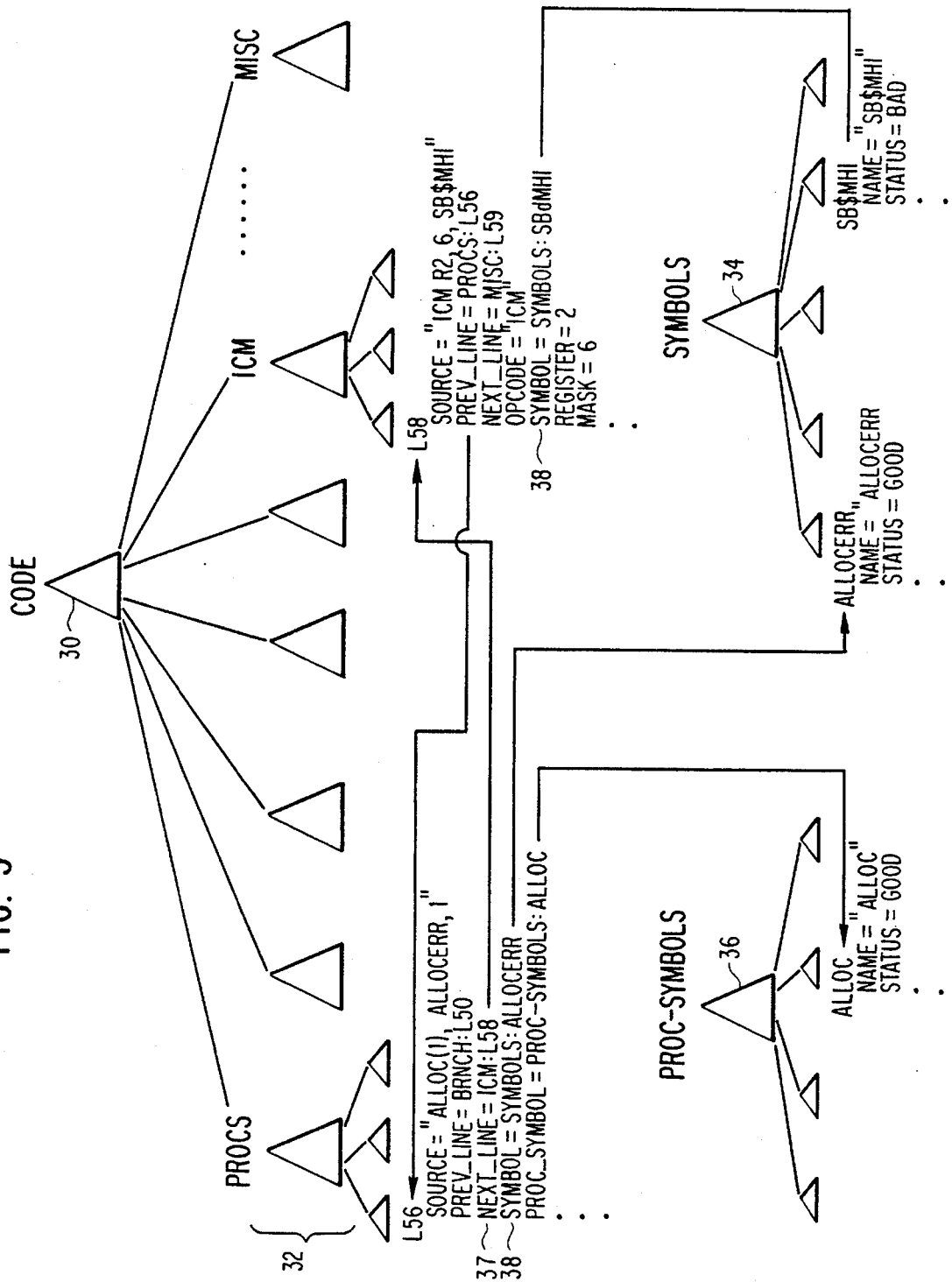
FIG. 3 is a diagram showing the structure of class/attribute hierarchies of the knowledge base.

As shown in FIG. 3 which illustrates in more detail the symbolic source information 13, CODE 30 is a parent class to fifteen subclasses 32 which inherit its attributes, collectively forming a two-level class/attribute hierarchy. Every source line in the current module (other than comments and certain assembler directives) falls into exactly one of the CODE subclasses 32, thereby partitioning the set of all source lines into homogeneous classes characterized by function or instruction type. All symbols (tags) referenced in the given module are treated as members of the class SYMBOLS 34, with the exception of proc names which belong to the PROC_SYMBOLS class 36. Both SYMBOLS and PROC_SYMBOLS have associated attribute sets representing characteristics of the individual members in each class.

Class members in the OS/3 knowledge base are logically connected by relation attributes associated with the class CODE. A relation attribute is a pointer to a member of a specified class, through which attribute values of the related member can be reached. Some relation attributes of the CODE class point to members of CODE itself, while others point to members of either SYMBOLS or PROC_SYMBOLS. FIG. 3 illustrates the design of the class/attribute hierarchies in the OS/3 knowledge base, although not all subclasses of CODE are shown. Relationships between example members in each class are depicted by arrows drawn from one member to another.

An example of a CODE attribute which points to another member of CODE is the relation attribute "next_line" 37. For each member of CODE (with the exception of the last line in the module), the attribute "next_line" points to the next significant line of code occurring in the given module.

An example of a CODE attribute which points to a member of the SYMBOLS class is the relation attribute "symbol" 38. For each source line whose first operand is a symbol, "symbol" points to the corresponding member of the SYMBOLS class. The path established by "symbol" allows the attribute values of the related SYMBOLS member to be retrieved or modified.

Once they are populated with members and attribute values, the class structures in the knowledge base form a repository for every implementation detail involved in a particular source code module. The information stored in these structures and the connectivity established between their members forms a rich framework from which higher level programming concepts can be abstracted.

Each module analyzed by the EMA is first processed by the parser 12, which converts the contents of a source code module into a form recognizable by the OS/3 knowledge base 14. The output of the parser 12 is a communications file consisting of statements asserting the existence of class members (i.e., source code lines, symbols and proc symbols) and their associated attribute values. Each time the OS/3 knowledge base 14 is invoked to analyze a particular module, the communications file associated with that module is accessed and its contents are read.

Demons are triggered by information contained in the communication file. Each demon in the knowledge base is designed to detect a unique instruction pattern, some consisting of single source lines and others consisting of multiple source lines related by common elements. In the process of reading class and attribute assertions from the communications file, a demon is activated by any member of CODE (i.e., any source line) which qualifies as its target line. Demons searching for single line patterns have only one possible target line. Demons which search for multiple line patterns use the line which is the most probable indicator of the pattern's existence as a target line.

When a demon identifies its target line, related demons are triggered to locate other source lines which complete the instruction pattern being sought. This chain reaction continues until the entire pattern is found or a terminating state is reached. Terminating states can be caused by conditions such as interfering instructions which negate the function of the pattern being sought or a scan which exceeds the maximum number of lines over which a pattern can be reasonably expected to occur. If a pattern is found, recommendations for code conversion are assigned as attribute values of the source lines involved. The cycle of target line identification and associated pattern line search continues until the entire communications file has been read.

The following description provides details of the implementation of class structures in the OS/3 knowledge base 14. Each class and its associated attributes are defined.

Certain information items pertaining to the current module are stored in global attributes defined in the OS/3 knowledge base. Global attributes are not associated with any one class, but act as value holders accessible throughout the entire knowledge base.

file name: Prefix of OS/3 source module to be analyzed (e.g., "TV$MIMM"). All related filenames are formed by appending extensions to this name.

debug: Determines if messages are generated for the terminal and log_file. (See log_file explanation below.)

module_name: Path name of current OS/3 source module relative to the OS3EMA directory. If the module named "TV$MIMM.OS3" is in the directory "OS3EMA/modules", module_name would have the value "OS3EMA/modules/TV$MIMM.OS3".

parser_version: Version of parser used to create communications file.

opcode_version: Version of opcode table used by parser to determine which class an OS/3 opcode belongs to when creating the communications file.

log_file: This attribute is set to the name of the Analyzer Trace file output by the Analyzer. If debug is set to true, a message is generated each time a demon fires. The log_file contains a list of all such messages generated during a single module analysis.

output_file: Contains all source line recommendations generated during a single module analysis. Once analysis is complete, the Report Formatter merges this file with the xxx.jnl file to produce the final output file, xxx.pm.

atl_file: This attribute is set to the name of the Analyzer Cross Reference file output by the Analyzer and used by the Report Formatter to produce the final EMA output.

status_file: This is an empty file created to indicate successful completion of a single module analysis.

version: Analyzer version; appears in the output file.

max: Limit on the number of significant lines to be scanned for pattern components.

opcodes: List of opcodes found in the last max lines of code read from the communications file.

opcode_hum: Number of opcode names stored in opcodes. Used in updating the list.

tab, any_message, any_rec, string, double: All are used for formatting purposes.

CODE is the parent class of the fifteen subclasses to which all source code lines belong. Attributes declared at the CODE level are inherited by each of its subclasses. The attributes of the CODE class are as follows:

psym: Proc symbol used in a proc call.

sym1,(sym2): Symbol used in first (second) address expression OR first (second) symbol argument to a proc call. The context of the instruction determines the way in which sym1 (sym2) is used.

sym3: Third symbol argument to a proc call (if one exists).

r1,(r2): First (second) register referenced by this instruction.

op1,(op2): Operator used in first (second) address expression. The operator type is defined as:
PLUS=+
MINUS=-
MULT=*
ERR=Error (expression was not evaluated by parser)
COMPLEX=Complex expression, not fully evaluated. In this case, the parser passes along the first symbol used in the expression as sym1 (sym2) and sets the value of op1 (op2) to COMPLEX to indicate an incomplete evaluation.

dis1,(dis2): Displacement used in first (second) address expression. Note that in cases where a symbol is equated to an integer value and used as the displacement, dis1 (dis2) is undetermined but the displacement value is stored in the initv attribute of the symbol pointed to by sym1 (sym2).

b1,(b2): first (second) base register referenced by this instruction or third (fourth) register referenced by a USING statement.

m: Mask value used in this instruction. For branch instructions, the mask value is the normal OS/3 condition code mask (e.g., m8 for BE). The mask has special values for specialized types of OS/3 branch instructions:
BCT, BCTR m16
BC, BCR m17
BXH, BXLE m18
SVC m19 x: Index value used in this instruction or fifth register referenced by a USING statement.

i: Immediate storage value used in this instruction.

len1,(len2): First (second) length value used in this instruction.

prev: Previous significant source code line occurring in module.

temp_prev: Temporary previous source line. Initially, temp_prev is set to prev, but it is constantly reassigned in the process of a backward search. When the search terminates (successfully or not), temp_prev is set back to prev in preparation for the next backward search.

num: Position of this instruction relative to consecutively numbered significant source code lines in the current module.

name: Literal name of opcode used in this instruction.

next: Next significant source code line occurring in module.

temp_next: Same definition as temp_prev, but for the next instead of the previous significant line.

prev(next)_line: Previous (next) pattern line relative to this instruction; used only for a three line pattern search. When the first two lines of a three line pattern are found as the target lines a and b, one of those lines is used as the target for the second part of the search (say line b). Line a needs to be "remembered" by line b before starting the search for line c, so line a is stored in the prev_line attribute of line b.

bstat: Status of a backward search. When searching back from a target line, bstat is set to "changed" if the search terminates successfully (i.e., a valid pattern line is found), or "stopped" if the search terminates unsuccessfully (i.e., the maximum number of lines have been scanned without finding a valid pattern line, an absolute branch is encountered, or an instruction altering the register referenced by the target line is found).

fstat: Same definition as bstat, but for forward searching.

rule: List of rules which apply to this line. Used as a flag to prevent further searching from a target line which has already been identified as part of a valid pattern.

output: Text string containing all recommendations determined for this line.

Each significant line of source code in the current module becomes a member of one of the CODE subclasses. Non-significant lines are comments and certain assembler directives. Certain CODE subclasses include source lines with different opcodes (mixed opcode classes), while others include only source lines with the same opcode (single opcode classes). Each subclass includes only those lines which are potential target lines of a specific pattern. The exceptions are DIR (the class of all compiler directives) and MISC_CLASS, a catch-all class for those instructions which do not occur as target lines of any pattern. All CODE subclasses inherit the attributes of the parent class CODE. There are no new attributes at the subclass level.

Members of the SYMBOLS class are all symbols referenced in the current module with the exception of proc names which belong to the PROC_SYMBOLS class. Since the knowledge base 14 does not allow special characters in member names, the parser 12 generates member names from the OS/3 symbol name using upper case for all alphabetic characters and the following translation for special characters:

| | |
|---|---|
| * → s | @ → a |
| $ → d | ? = q |
| # = p | & → m |

For example, OS/3 symbols SB$MHI and TO@DEXP translate to member names SBdMHI and TOaDEXP, respectively. Member names are strictly internal to the OS/3 knowledge base 14 and are seen by the user only if her or she wishes to look at the communications file (xxx.kcm).

Attributes of the SYMBOLS class are as follows:

name: Actual symbol name used in the OS/3 code.

initv: Initial value of LTORG, DS, DC, or EQU symbols. All numeric values are resolved to decimal.

decl: Line number on which LTORG, DC, DS, or EQU symbol is declared.

stat: Symbol status; can take on one of the following values or remain undetermined if none apply:
CG#→Changed Global (# defined in SYMBOL CODES document)
AL1→Symbol declared with address length one.
AL3→Symbol declared with address length three.
SL→Suspect Local.

ref: List of line numbers on which a symbol is referenced. This list is accumulated in the actions section and appears in the Analyzer Trace file (xxx.alt).

ref_cnt: Number of lines on which a symbol is referenced; used to format the output.

Members of the PROC_SYMBOLS class are all the proc names used in the current module. Member names are handled as for symbols in the SYMBOLS class. The attributes of PROC_SYMBOLS are as follows:

name: Literal proc name used in the OS/3 code.

stat: Passed in as "changed proc" if symbol appears on list of changed procs; otherwise, remains undetermined.

The following description provides details of the implementation of demons in the OS/3 knowledge base. Demons in the OS/3 knowledge base have the following format:

DEMON NAME:
[variable declaration statement]
associates this demon with a class and declares a variable which is used to access the associated class members' attribute values
WHEN
[guard]
conditions involving attributes of some member of the associated class which must be satisfied in order for the demon body to execute
THEN
[body]
commands executed when the guard evaluates as true
ENDWHEN DEMON NAME is an arbitrary name which uniquely identifies each demon in the knowledge base. The variable declaration statement following the DEMON NAME associates a demon with a specific knowledge base class. WHEN, THEN and ENDWHEN are required KES keywords which break the demon into its guard and body sections. A demon acts as a process which is invoked for every member of its associated class as soon as that member's attributes are known, provided the attributes satisfy the conditions imposed in the demon guard. A demon is reinvoked on the same class member whenever that member is reassigned new attribute values which satisfy the guard conditions. Since every demon in the OS/3 knowledge base is designed to detect the target line of a particular instruction pattern, the class to which a demon is associated is always the subclass of CODE to which that target line belongs. Hence, the class members evaluated in the demon guard are only those instructions which are potential target lines of the pattern that demon detects. Conversely, members of each CODE subclass corresponds to the group of instructions targeted by a specific demon.

Demons in the OS/3 knowledge base are conceptually grouped into categories based on the number of lines in the pattern detected (one, two, or three), the direction of search for the next line of a multiple line pattern, and in the case of three line patterns, the search step which the demon handles (i,e. step one—have first line, look for second; step two—have second line, look for third). Based on these criteria, the following demon categories emerge:

1) One line pattern—no search
2) Two line pattern—backward search
3) Two line pattern—forward search
4) Three line pattern—backward search—step one
5) Three line pattern—forward search—step one
6) Three line pattern—backward search—step two
7) Three line pattern—forward search—step two All demons in the same category perform similar functions and hence share the same general structure. The structure of demons in each of the seven categories is outlined below in pseudocode and illustrated in the corresponding flow charts shown in FIGS. 4 to 10. The following naming conventions are used in all pseudocode and flow chart examples:

LINE refers to the current source line under examination whose attributes are tested in the demon guard. This line is a member of the demon's associated class and hence, a potential target line for the pattern being sought.

TRUE PREVIOUS refers to the source line immediately preceding LINE in the current module. TRUE PREVIOUS is an attribute of LINE.

PREVIOUS refers to a source line occurring somewhere above LINE in the current module. This line is initially set to TRUE PREVIOUS, but is continually reset in the process of a backward search. PREVIOUS is an attribute of LINE.

TRUE NEXT refers to the source line immediately following LINE in the current module. TRUE NEXT is an attribute of LINE.

NEXT refers to a source line occurring somewhere below the LINE in the current module. This line is initially set to TRUE NEXT, but is continually reset in the process of a forward search. NEXT is an attribute of LINE.

The pseudocode for the general structure of a demon which identifies a one line pattern is as follows:

```
ONE LINE PATTERN:
WHEN
    all attributes of LINE are known
```

```
        THEN
            if LINE is a valid pattern then
                if invalid address symbols found then
                    tag the symbols "suspect"
                endif
                recommend code changes for this LINE
            endif
        ENDWHEN
```

A demon which identifies a one line pattern is invoked for each member of its associated class at the moment all attributes of that member are known.

Figure 4:
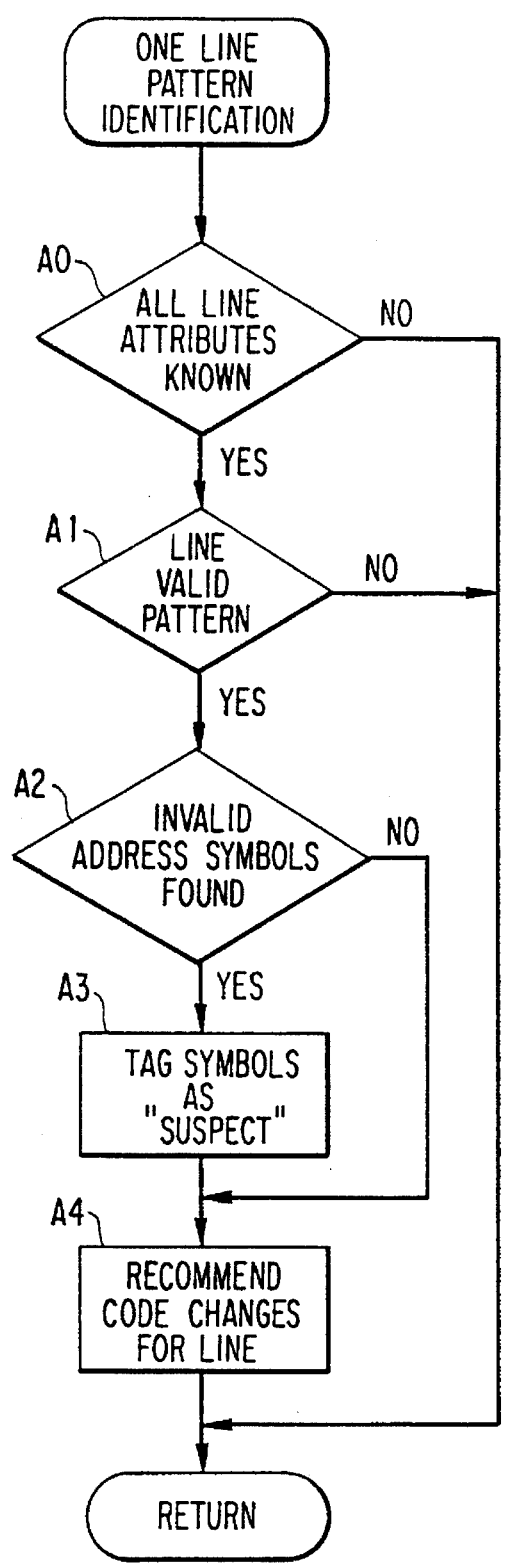
FIG. 4 is a flow chart showing the EMA process for one line pattern identification with no search.

The flow chart of FIG. 4 shows the process implemented by this pseudocode. The process begins at decision block 40 which determines if all attributes of LINE are known. If they are, a test is then made in decision block 41 to determine if LINE is a valid pattern. If either of the tests made in decision blocks 40 or 41 should fail, the process returns. If both are true, a test is made in decision block 42 to determine if LINE contains symbols used as an invalid addresses. If this test fails, control goes directly to function block 44. If the test succeeds, the symbols are tagged as "suspect" in function block 43 before code changes are recommended in function block 44.

The pseudocode for the general structure of a demon which identifies a two line pattern using a backward search is as follows:

```
TWO LINE PATTERN - BACKWARD SEARCH:
WHEN
    all attributes of LINE are known and
    PREVIOUS line exists
THEN
    if LINE is not tagged with this pattern and
        LINE and PREVIOUS are a valid pattern then
        if invalid address symbols found then
            tag the symbols "suspect"
        endif
        recommend code changes for one or both lines
        tag LINE with this pattern
        set back search for LINE to success
        set PREVIOUS line to TRUE PREVIOUS line
    else
        if back search for LINE is not set then
            if PREVIOUS negates this pattern then
                set back search for LINE to failure
                set PREVIOUS line to TRUE PREVIOUS line
            else
                set PREVIOUS back one line
            endif
        endif
    endif
ENDWHEN
```

A demon which identifies a two line pattern with a backward search is invoked for each member of its associated class when all attributes of that member are known and its PREVIOUS line exists. The demon is reinvoked on a member each time its PREVIOUS line is reset. In effect, the demon is repeatedly called for the same target line with a new value for PREVIOUS until the first line of the pattern is found or a condition exists which terminates the pattern search.

Figure 5:
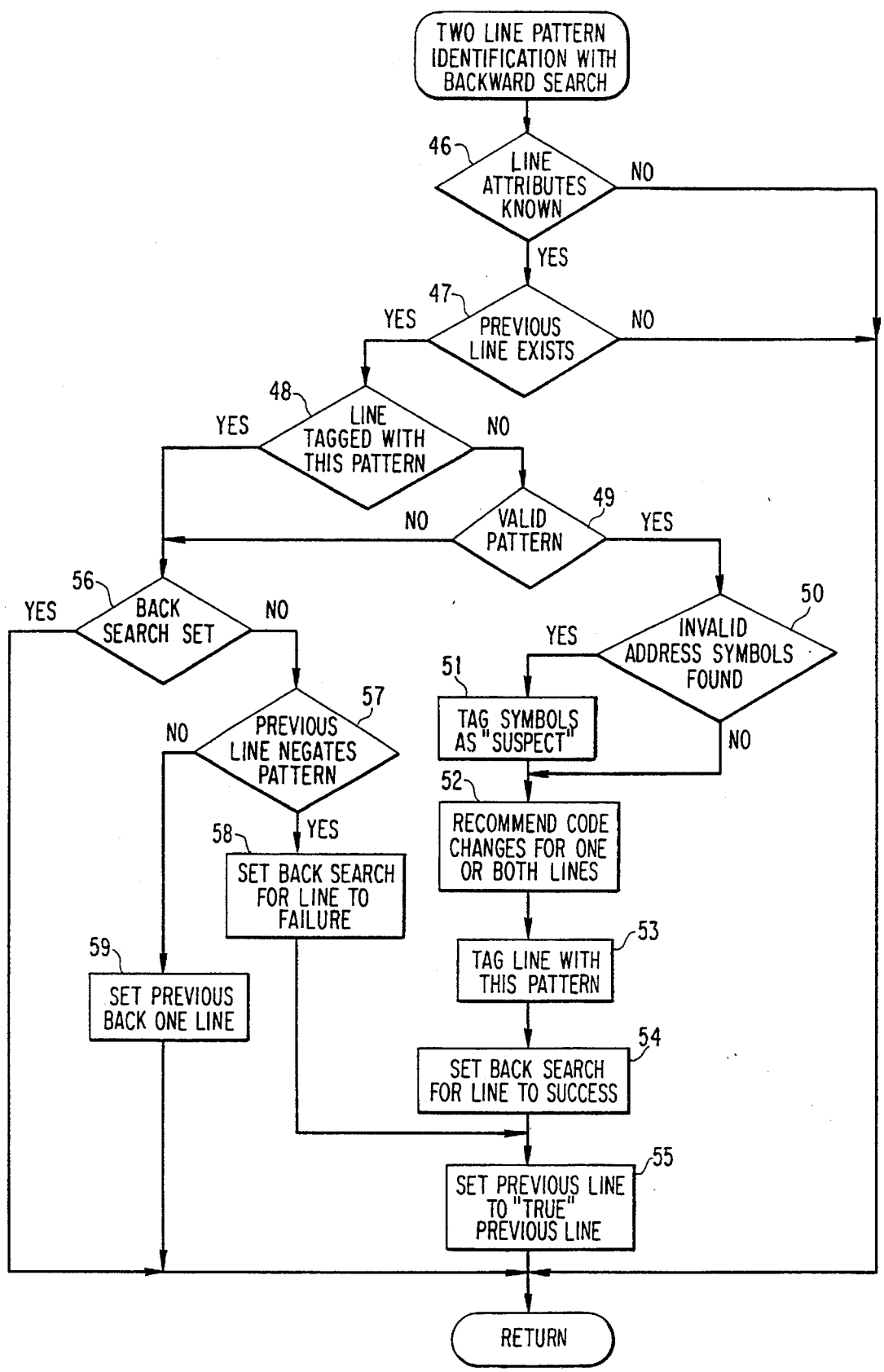
FIG. 5 is a flow chart showing the EMA process for two line pattern identification with a backward search.

The flow chart of FIG. 5 shows the process implemented by the pseudocode for a two line pattern using a backward search. The process begins at decision block 46 which determines if all attributes of LINE are known. If they are, a test is then made in decision block 47 to determine if the PREVIOUS line exists. If either of the tests made in decision blocks 46 or 47 should fail, the process returns. If both tests succeed, a test is made in decision block 48 to determine if LINE is already tagged with this pattern. If LINE is not tagged with this pattern, a further test is made in decision block 49 to determine if LINE and PREVIOUS form a valid pattern. If a valid pattern is found, a test is made in decision block 50 to determine if either line contains symbols used as invalid addresses. If invalid address symbols are not found, control goes directly to function block 52. If invalid address symbols are found, the symbols are tagged as "suspect" in function block 51 before recommending code changes for one or both pattern lines in function block 52. Next in function block 53, LINE is tagged with the current pattern, and in function block 54, back search for LINE is set to success. Finally, in function block 55, PREVIOUS line is set to the TRUE PREVIOUS line and the process returns.

Returning to decision blocks 48 and 49, if LINE has already been tagged with this pattern or LINE and PREVIOUS line do not form a valid pattern, a test is made in decision block 56 to determine if back search for this LINE has already been set. If it has been set (indicating that a backward search from this LINE terminated in either a successful or unsuccessful state), the process returns. If back search has not been set, a further test is made in decision block 57 to determine if the PREVIOUS line negates the pattern. If the PREVIOUS line does negate the pattern, back search is set to failure in function block 58 before control goes to function block 55. If the PREVIOUS line does not negate the pattern, PREVIOUS is set back one line in function block 59 and the process returns.

The pseudocode for the general structure of the demon pair which identifies a two line pattern using a forward search is as follows:

```
TWO LINE PATTERN - FORWARD SEARCH
IDENTIFICATION PART:
WHEN
    all attributes of LINE are known and
    NEXT line exists
THEN
    if LINE is not tagged with this pattern and
        LINE and NEXT are a valid pattern then
        if invalid address symbols found then
            tag the symbols "suspect"
        endif
            recommend code changes for one or both lines
            tag LINE with this pattern
            set forward search for LINE to success
            set NEXT to TRUE NEXT
    endif
ENDWHEN
SEARCH PART:
WHEN
    all attributes of LINE are known and
    NEXT line exists and
    line after NEXT exists
THEN
    if forward search for LINE is not set then
        if LINE is a valid target line then
            if NEXT line negates pattern then
                set forward search to failure
                set NEXT line to TRUE NEXT line
            else
                set NEXT ahead one line
            endif
        endif
    endif
ENDWHEN
```

Patterns requiring a forward search are handled separately by two related demons, one for pattern identification and one for pattern search. The tasks are split for performance sake because only LINE (the target line) and NEXT are needed to identify a valid pattern, while LINE, NEXT, and the line after NEXT are needed for a pattern search. The two tasks are handled by a single demon in the backward searching case because the line before PREVIOUS is already known whenever LINE and PREVIOUS are known.

Together, each pattern identification and pattern search pair comprise the structure of a demon in the two line backward search category. The guard of the pattern identification demon checks for all LINE attributes and the existence of NEXT, while the guard of the pattern search demon checks for the line after NEXT as well to accommodate the forward searching case. The pattern identification demon corresponds to the "WHEN—THEN—IF" part of a two line backward searching demon, while the pattern search demon corresponds to the "WHEN—THEN—ELSE" part. If LINE and NEXT constitute a valid pattern, the body of the pattern identification demon is executed. If they do not constitute a valid pattern and the line after NEXT exists, the body of the pattern search demon is executed. The pattern search demon is reinvoked on the same target line each time NEXT is reset until NEXT is pointing to the second line of the pattern or a condition exists which terminates the search. When NEXT points to the second pattern line, the pattern identification demon executes and the cycle terminates. The two demons effectively produce the same repetitive behavior in the forward direction that is produced by one demon in the backward searching case.

Figure 6:
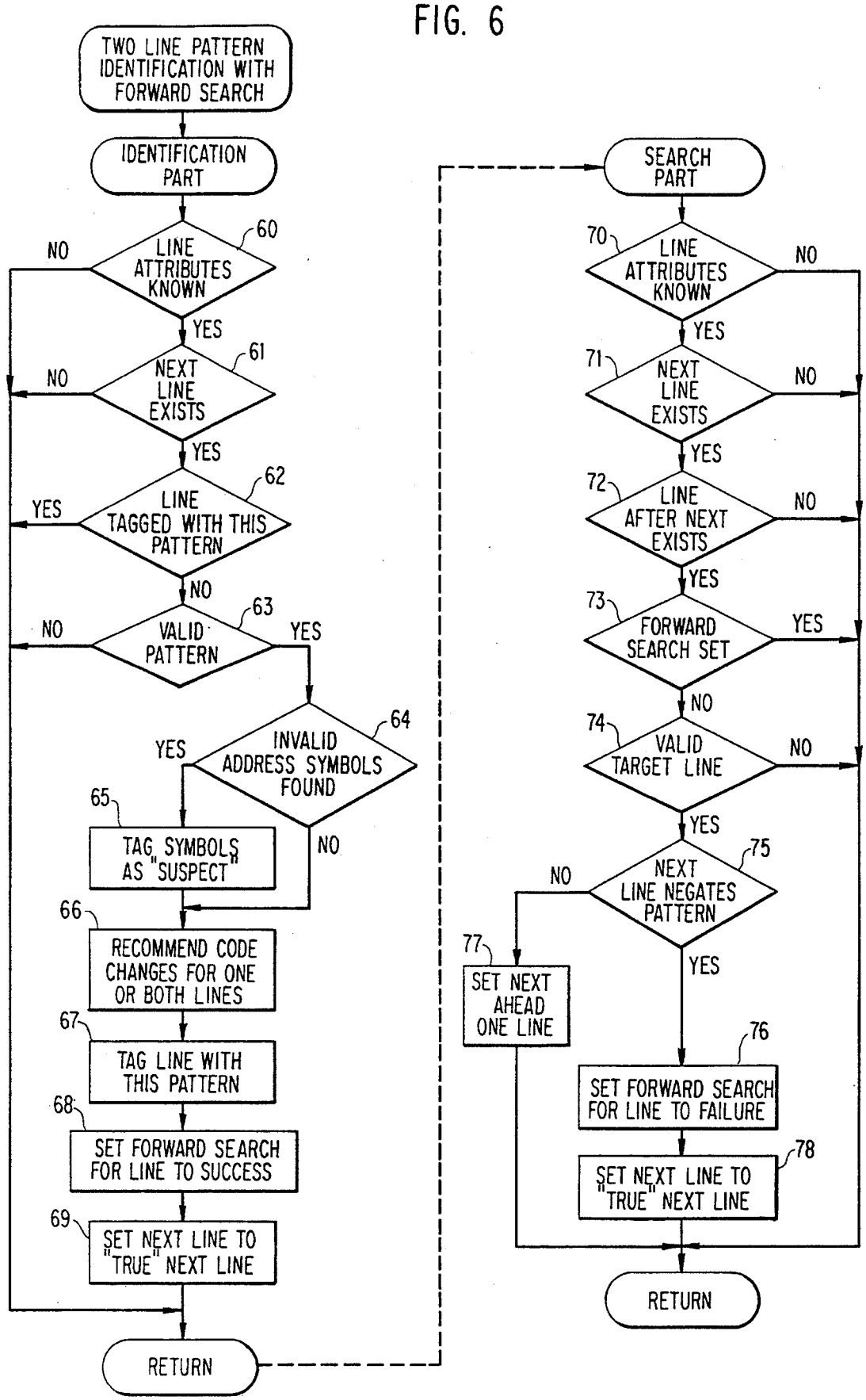
FIG. 6 is a flow chart showing the EMA processes for two line pattern identification with a forward search.

The flow chart of FIG. 6 shows the processes implemented by the pseudocode for a two line pattern using a forward search. The process begins with the identification part at decision block 60 which determines if all attributes of LINE are known. If they are, a test is then made in decision block 61 to determine if the NEXT line exists. If NEXT does exist, a test is made in decision block 62 to determine if LINE is already tagged with this pattern. If LINE is not tagged with this pattern, a further test is made in decision block 63 to determine if LINE and NEXT form a valid pattern. If any of the tests made in decision blocks 60, 61 or 63 should fail or if the test made in decision block 62 succeeds, the process returns. If LINE and NEXT do form a valid pattern, a test is made in decision block 64 to determine if either line contains symbols used as invalid addresses. If invalid address symbols are not found, control goes directly to function block 66. If invalid address symbols are found, the symbols are tagged as "suspect" in function block 65 before recommending code changes for one or both pattern lines in function block 66. Next in function block 67, LINE is tagged with the current pattern, and in function block 68, forward search for LINE is set to success. Finally, in function block 69, NEXT is set to the TRUE NEXT line and the process returns.

The search part begins at decision block 70 which determines if all attributes of LINE are known. If they are, a test is made in decision block 71 to determine if the NEXT line exists. If NEXT does exist, a test is made in decision block 72 to determine if the line after NEXT exists. If this test succeeds, a further test is made in decision block 73 to determine if forward search for this LINE has already been set. If forward search has not been set, a test is made in decision block 74 to determine if LINE is a valid target line for this pattern. If any of the tests made in decision blocks 70, 71, 72 or 74 should fail or if the test in decision block 73 succeeds (indicating that a forward search from this LINE terminated in either a successful or unsuccessful state), the process returns. Otherwise, a test is made in decision block 75 to determine if the NEXT line negates the pattern. If NEXT does negate the pattern, forward search for this LINE is set to failure in function block 76 and NEXT line is set to the TRUE NEXT line in function block 78 before the process returns. If the NEXT line does not negate the pattern, NEXT is set ahead one line in function block 77 and the process returns.

Patterns consisting of three instruction lines are handled by related demons which cooperate to accomplish the two steps needed to find the entire pattern. In step one, the pattern's primary target line is located and a search is conducted (either backward or forward) for the next pattern line. The primary target line (the target line used in step one which is the most probable indicator of the pattern's existence) can be the first, second or third line in the pattern. The position of the target line determines the direction of search for the next pattern line. If a backward search is required, step one is handled by a single demon which is similar in structure to demons in the two line backward search category. If a forward search is required, step one is handled by a demon pair which is similar in structure to demon pairs in the two line forward search category. In either case, if the demon or demon pair handling step one is successful in finding the next pattern line, one of the lines involved in step one is modified to qualify it as the secondary target line (the target line used in step two). In step two, the secondary target line is located and a search ensues (either backward or forward) for the last pattern line. As in step one, a backward search is handled by a single demon and a forward search is handled by a demon pair.

Patterns which use the same line as the primary and secondary target lines use different search directions in step one and step two, while patterns using different lines as the primary and secondary target lines use the same search direction in step one and step two, as illustrated below.

Group A
Same target line, different search directions

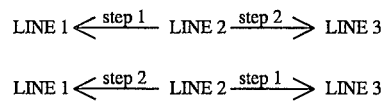

Group B
Different target lines, same search direction

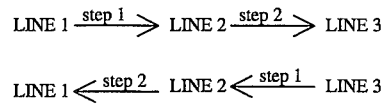

There are minor differences in the way secondary target lines are handled by demons in Group A and those in Group B. For the sake of brevity, pseudocode and flow chart examples are given only for step one and step two demons handling three line patterns of the type in Group B, where the primary target line is different from the secondary target line.

The pseudocode for the general structure of a demon which handles step one of a three line pattern identification using a backward search is as follows:

---

THREE LINE PATTERN - BACKWARD SEARCH -
STEP ONE:
WHEN
    all attributes of LINE are known and
    PREVIOUS line exists
THEN
    if LINE is not tagged with this pattern and
        LINE and PREVIOUS are a valid pattern then
        if invalid address symbols found then

```
        tag the symbols "suspect"
      endif
      recommend code changes for one or both lines
      tag LINE and PREVIOUS with this pattern
      set back search for LINE to success
      set "next pattern line" of PREVIOUS to LINE
      set PREVIOUS to TRUE PREVIOUS
    else
      if back search for LINE is not set then
        if PREVIOUS negates this pattern then
          set back search for LINE to failure
          set PREVIOUS to TRUE PREVIOUS
        else
          set PREVIOUS back one line
        endif
      endif
    endif
ENDWHEN
```

The structure of this demon is essentially the same as a demon in the two line pattern backward search category with two additional functions performed in the demon body. If a valid pattern is found, both PREVIOUS and LINE are tagged with this pattern (rather than just LINE), and the "next pattern line" attribute of PREVIOUS is set to LINE.

Tagging PREVIOUS with this pattern qualifies PREVIOUS as the secondary target line for this pattern. Setting the "next pattern line" attribute of PREVIOUS to LINE establishes a connection between these two lines so that attributes of LINE can be accessed and possibly modified by the demon handling step two for this pattern.

Figure 7:
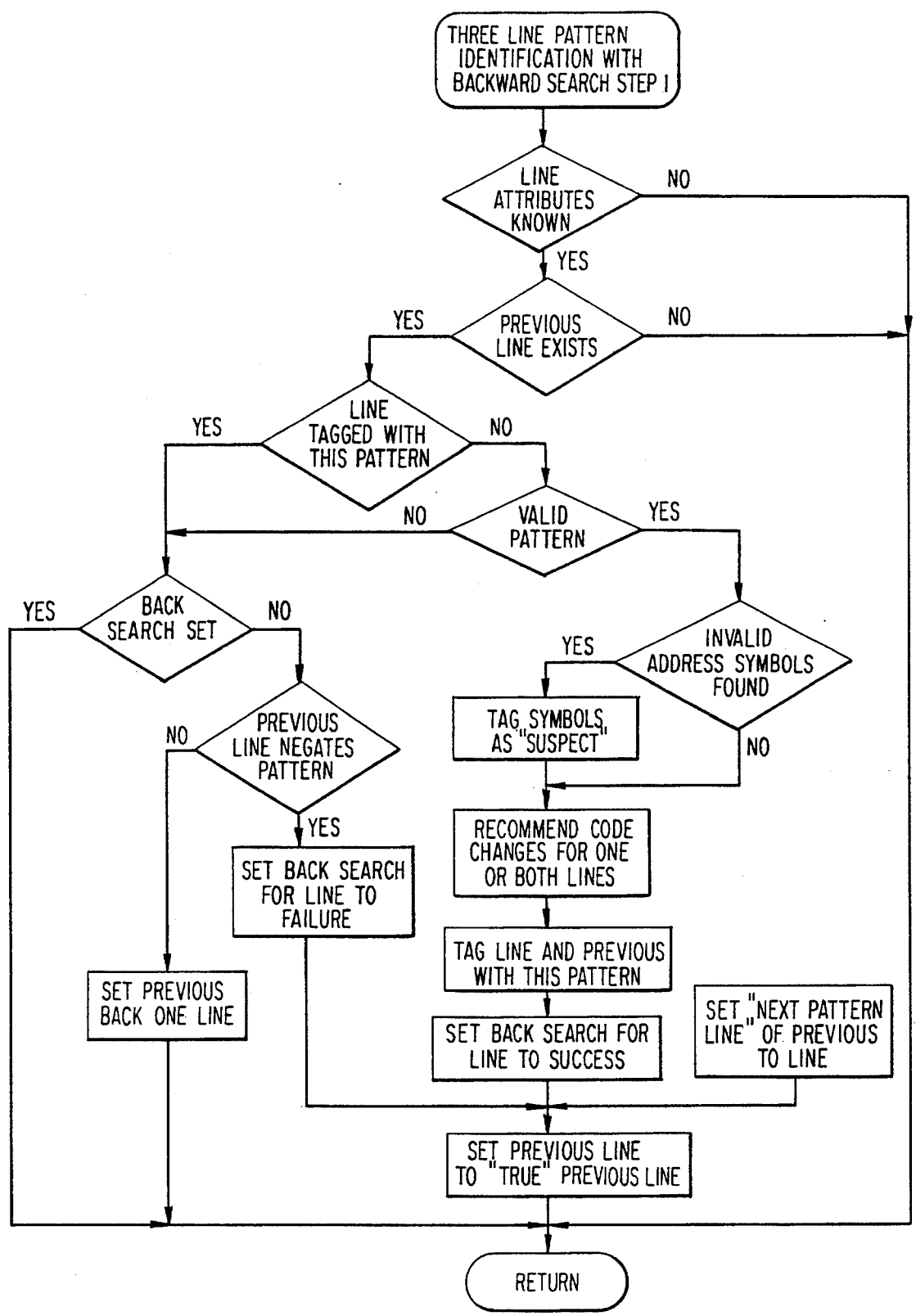
FIG. 7 is a flow chart showing the EMA process for three line pattern identification with a backward search, step 1.

FIG. 7 is a flow chart of the process implemented by the pseudocode above. A comparison of this flow chart with that of FIG. 5 will demonstrate the similarity between a demon which handles step one of a three line pattern backward search, and one which handles a two line pattern backward search. Because of the similarity, no further discussion will be made of FIG. 7.

The pseudocode for the general structure of the demon pair which handles step one of a three line pattern identification using a forward search is as follows:

```
THREE LINE PATTERN - FORWARD SEARCH -
STEP ONE
IDENTIFICATION PART:
WHEN
    all attributes of LINE are known and
    NEXT line exists
THEN
    if LINE is not tagged with this pattern and
      LINE and NEXT are a valid pattern then
        if invalid address symbols found then
          tag the symbols "suspect"
        endif
        recommend code changes for one or both lines
        tag LINE and NEXT with this pattern
        set forward search for LINE to success
        set "previous pattern line" of NEXT to LINE
        set NEXT line to TRUE NEXT line
    endif
ENDWHEN
SEARCH PART:
WHEN
    all attributes of LINE are known and
    NEXT line exists and
    line after NEXT exists
THEN
    if forward search for LINE is not set then
      if LINE is a valid target line then
        if NEXT line negates pattern then
          set forward search to failure
          set NEXT line to TRUE NEXT line
        else
          set NEXT ahead one line
        endif
      endif
    endif
ENDWHEN
```

The structure of the demon pair is essentially the same as the demon pair in the two line pattern forward search category with two additional functions performed in the body of the identification part. If a valid pattern is found, both NEXT and LINE are tagged with this pattern (rather than just LINE), and the "previous pattern line" attribute of NEXT is set to LINE. Tagging NEXT with this pattern qualifies NEXT as the secondary target line for this pattern. Setting the "previous pattern line" attribute of NEXT to LINE establishes a connection between these two lines so that attributes of LINE can be accessed and possibly modified by the demon handling step two for this pattern.

Figure 8:
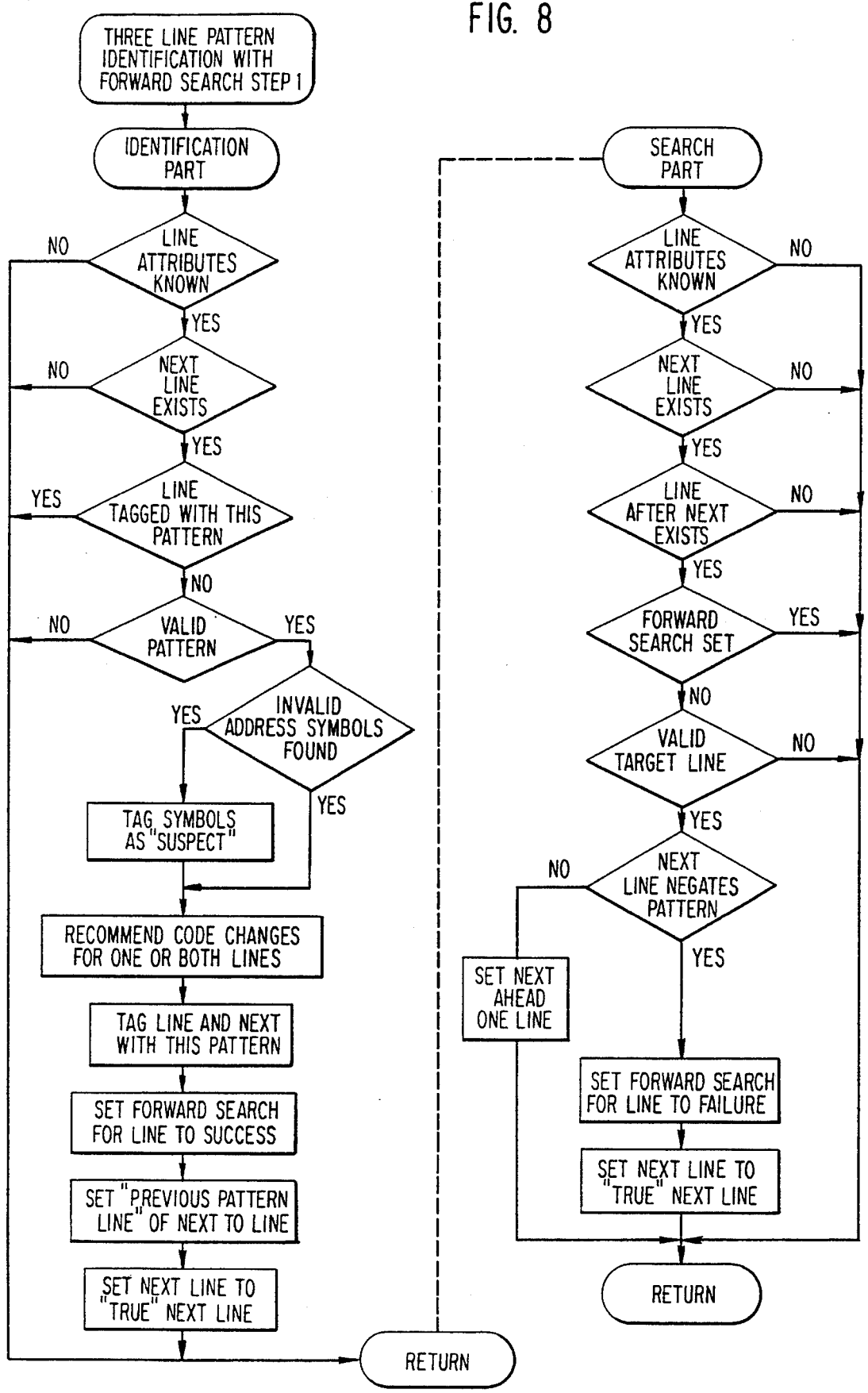
FIG. 8 is a flow chart showing the EMA processes for three line pattern identification with a forward search, step 1.

FIG. 8 is a flow chart of the process implemented by the pseudocode above. A comparison of this flow chart with that of FIG. 6 will demonstrate the similarity between a demon pair which handles step one of a three line pattern backward search, and a demon pair which handles a two line pattern backward search. Because of the similarity, no further discussion will be made of FIG. 8.

The pseudocode for the general structure of a demon which handles step two of a three line pattern identification using a backward search is as follows:

```
THREE LINE PATTERN - BACKWARD SEARCH -
STEP TWO:
WHEN
    all attributes of LINE are known and
    LINE is secondary target line and
    PREVIOUS line exists
THEN
    if LINE is not tagged with this pattern and
      LINE and PREVIOUS are a valid pattern then
        if invalid address symbols found then
          tag the symbols "suspect"
        endif
        recommend code changes for one or both lines
        tag LINE with this pattern
        set back search for LINE to success
        set PREVIOUS to TRUE PREVIOUS
    else
      if back search for LINE is not set then
        if PREVIOUS negates this pattern then
          set back search for LINE to failure
          set PREVIOUS to TRUE PREVIOUS
        else
          set PREVIOUS back one line
        endif
      endif
    endif
ENDWHEN
```

Figure 9:
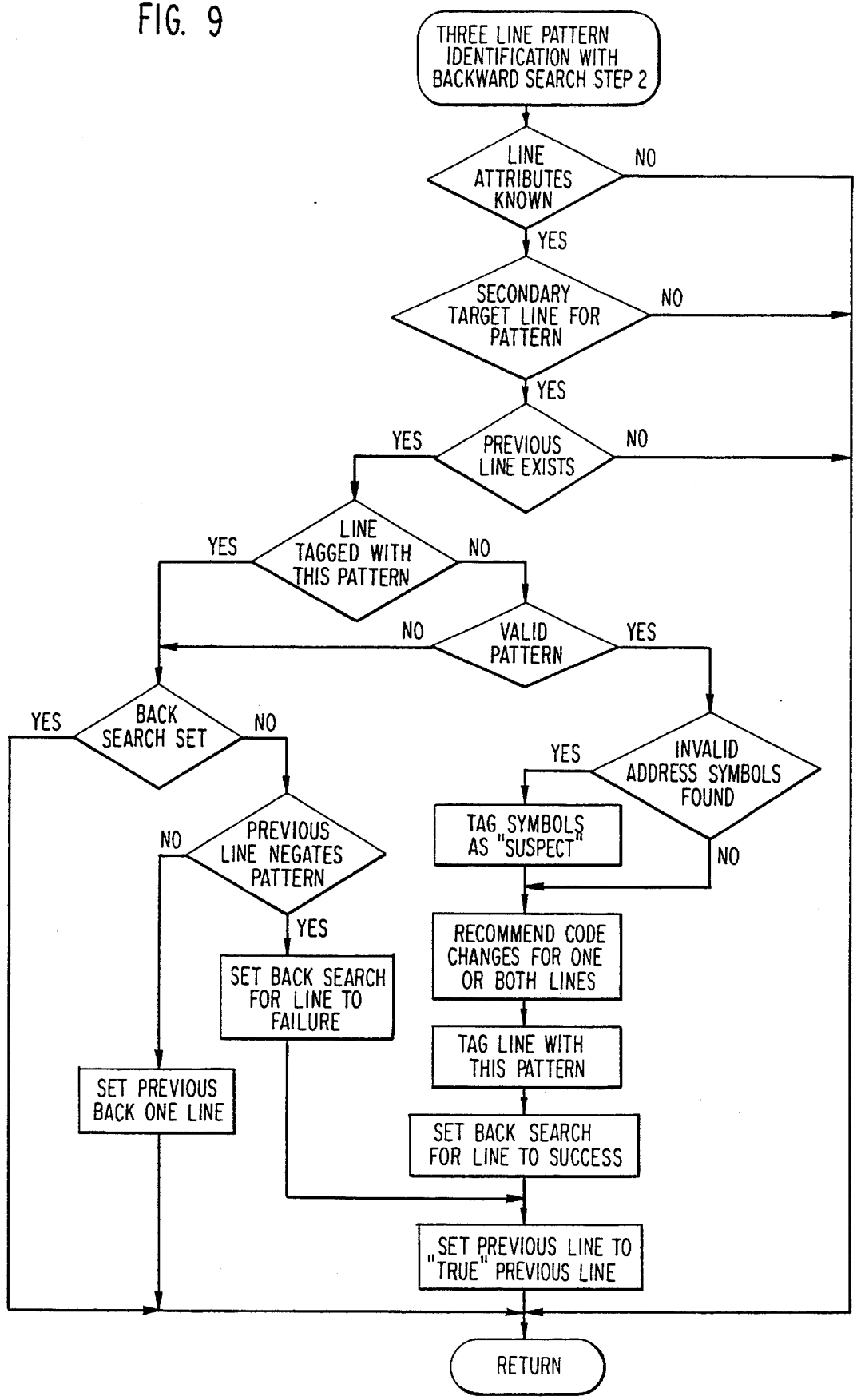
FIG. 9 is a flow chart showing the EMA process for three line pattern identification with a backward search, step 2.

The structure of this demon is essentially the same as a demon in the two line pattern backward search category with one additional test made in the guard. LINE must qualify as the secondary target line for this pattern, a condition which is true if LINE has been modified by the demon handling step one for this pattern. The flow chart for the process implemented by this pseudocode is shown in FIG. 9. Again, a comparison of this flow chart with that in FIG. 5 will demonstrate the similarity between this demon and that for a two line backward search.

The pseudocode for the general structure of a demon which handles step two of a three line pattern identification using a forward search is as follows:

```
THREE LINE PATTERN - FORWARD SEARCH -
STEP TWO
IDENTIFICATION PART:
WHEN
    all attributes of LINE are known and
    LINE is secondary target line and
    NEXT line exists
THEN
    if LINE is not tagged with this pattern and
        LINE and NEXT are a valid pattern then
            if invalid address symbols found then
                tag the symbols "suspect"
            endif
            recommend code changes for one or both lines
            tag LINE with this pattern
            set forward search for LINE to success
            set NEXT line to TRUE NEXT line
    endif
ENDWHEN
SEARCH PART:
WHEN
    all attributes of LINE are known and
    LINE is secondary target line and
    NEXT line exists and
    line after NEXT exists
THEN
    if forward search for LINE is not set then
        if NEXT line negates pattern then
            set forward search to failure
            set NEXT line to TRUE NEXT line
        else
            set NEXT ahead one line
        endif
    endif
ENDWHEN
```

Figure 10:
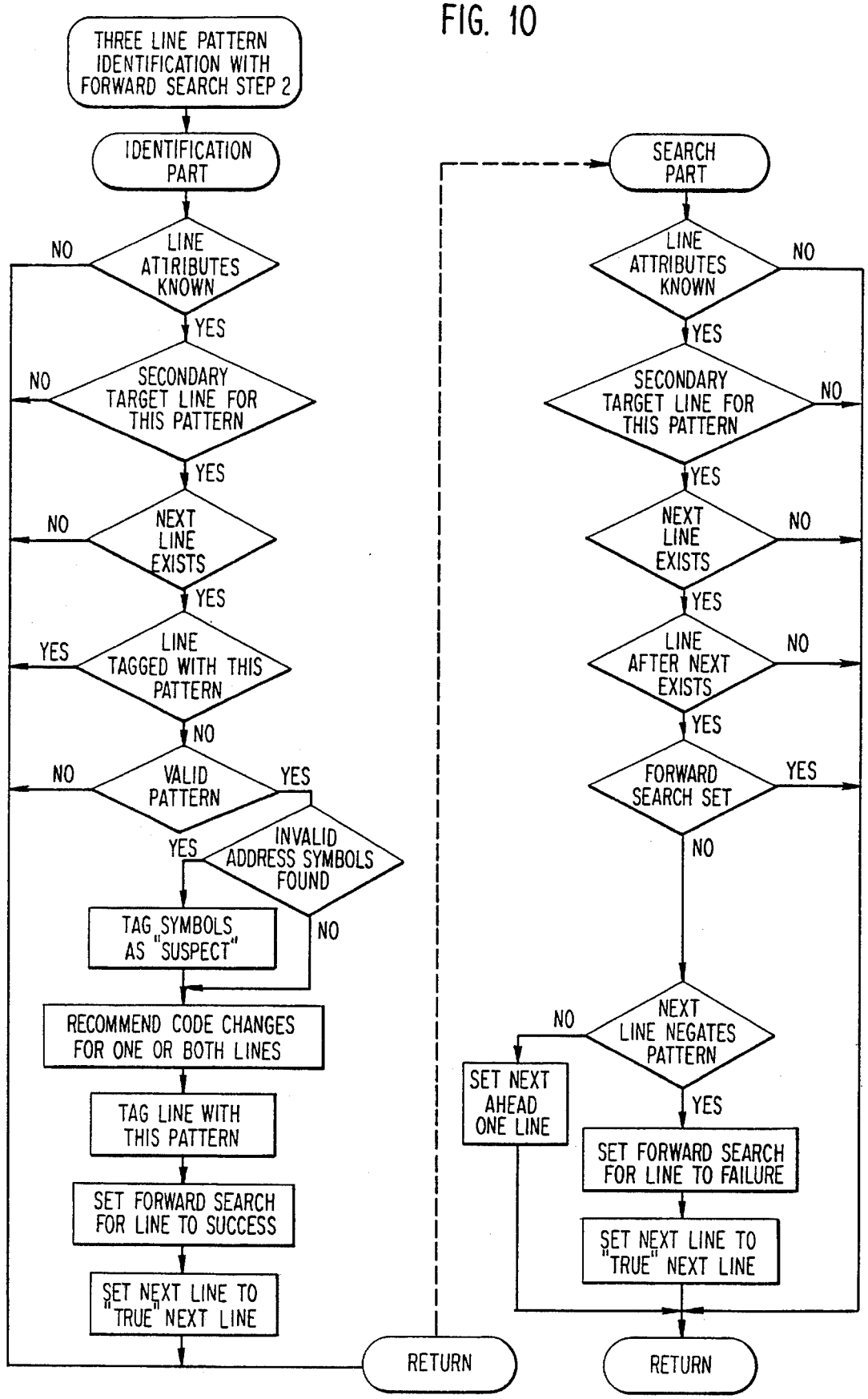
FIG. 10 is a flow chart showing the EMA processes for three line pattern identification with a forward search, step 2.

The structure of this demon pair is essentially the same as a demon pair in the two line pattern forward search category with two exceptions. An additional test is made in both guards to determine if LINE qualifies as the secondary target line for this pattern, a condition which is true if LINE has been modified by the demon handling step one for this pattern. The addition of this test to the guard eliminates the need to determine if LINE is a valid target line in body of the search part demon. The flow chart for the processes implemented by this pseudocode is shown in FIG. 10. A comparison of FIG. 10 to FIG. 6 will demonstrate the similarity of the two processes.

Although the EMA was designed specifically to convert OS/3 to an extended memory platform, the underlying concepts used to accomplish this task are language and platform independent. If source code representation and conversion details are parameters to the code conversion problem, then given the proper parameters EMA technology can be applied to a broad range of conversion problems. For example, EMA technology could be applied to porting applications from one operating system to another, porting code from one hardware platform to another, or re-documenting systems which are old and expensive to maintain. The key aspects of the invention which easily extend the applicability of the EMA technology to other language conversion problems are 1) the way in which source code is represented, 2) the way in which conversion knowledge is represented, and 3) the way in which conversion knowledge is applied to case-specific information in order to arrive at a problem solution.

In the preferred embodiment, the EMA system provides an output report of recommended source code modifications; however those skilled in the art will recognize that other output scenarios exist which may be implemented according to specific application requirements. For example, rather than providing an output of recommended source code modifications, the EMA system may readily generate the fully modified source code, or the source code may be generated with recommended changes inserted as comments. In either case, the EMA system may be interactive by querying the user for approval of automated source code changes.

Thus, while the invention has been described in terms of a single preferred embodiment, those skilled in the art will recognize that the invention can be practiced with modification within the spirit and scope of the appended claims.

I claim:

1. A computer program analyzer for aiding a computer programmer in modifying a computer program to run on a different computer architecture than an architecture for which the program was originally written comprising;

parser means for receiving a computer program in source code form and generating symbolic source information having source code lines, said source information being organized into hierarchical data structures which partition all source code lines into homogeneous classes characterized by function or instruction type;

a knowledge base containing structures for representing said source code and information on conversion rules for modifying said source code for said different computer architecture;

an inference engine connected to said parser means and knowledge base for receiving said organized symbolic source information and selectively retrieving said conversion rules for applying said conversion rules to said symbolic source information and for generating outputs including recommendations for source code modification, a trace of rules used in arriving at said recommendations and a cross reference of all symbol names used on source lines which have been cited for change; and report formatter means connected to said parser means for receiving said organized symbolic source information and to said inference engine for receiving said recommendations, trace and cross reference for generating a report of recommendations for source code modification for use by said programmer.

2. A system, including a computer, for automatically modifying a first computer program developed to run in a first program environment, defined by a computer architecture, a computer operating system, or a computer architecture and computer operating system, to run in a different second program environment, said system comprising:

symbol generating means for generating an intermediate symbolic representation of said first computer program wherein said representation is independent of a particular program environment and wherein said intermediate symbolic representation includes class attribute structures which correspond to the first computer program;

knowledge base means for providing a plurality of rules for use in analyzing said intermediate symbolic representation, wherein at least one set of said plurality of rules is for analyzing said intermediate symbolic representation for said different second program environment;

analyzer means, coupled to said symbol generating means and to said knowledge base means, for determining a plurality of changes to make to said first computer program and for analyzing said intermediate symbolic representation to identify a plurality of patterns of non-adjacent instructions which require modification Using said set of said plurality of rules of said knowledge base and an inference engine means for applying said set of said plurality of rules to said intermediate symbolic representation; and output means, coupled to said analyzer means, for generating a second computer program which is fully compatible with said different second program environment based upon said plurality of changes determined by said analyzer means.

3. The system as recited in claim 2, wherein said output means includes report formatter means for generating a report of recommendations for computer program modification.

4. The system as recited in claim 3, wherein said output means includes code generator means for receiving computer program and for inserting said recommendations for computer program modification as comments in said first computer program.

5. The system as recited in claim 3, wherein said output means includes code generator means for receiving computer program and implementing said recommendations for computer program modification in said first computer program.

6. The system of claim 2, wherein said symbol generating means comprises a parser.

7. The system as recited in claim 6, wherein said parser includes means for generating formatted source code and a parser summary.

8. The system of claim 2, wherein said symbol generating means includes means for receiving as input an equivalence list of registers for each of said computer architectures and a list of changed global symbols for each of said computer architectures.

9. The system as recited in claim 2, wherein said inference engine includes means for generating a cross reference of all symbol names used on computer program lines which have been cited for change.

10. The system of claim 2 wherein said second computer program includes code to utilize a plurality of features of said second program environment which said first program did not previously include.

11. The system of claim 10 wherein one of said plurality of features is a different addressing mode from that employed in said first program environment.

12. A method of automatically modifying a first computer program developed to run in a first program environment, defined by a computer architecture, a computer operating system, or a computer architecture and computer operating system, to run in a different second program environment, comprising the computer performed steps of:

a) creating an intermediate symbolic representation of said first computer program in the form of a plurality of class structures of a knowledge base wherein said representation is independent of a particular program environment;

b) providing a knowledge base wherein said knowledge base includes a first plurality of rules associated with said different second program environment and wherein said first plurality of rules is for use in analyzing said intermediate symbolic representation;

c) analyzing said intermediate symbolic representation of said first computer program to identify a plurality of patterns of non-adjacent instructions which require modification using said set of said plurality of rules of said knowledge base to determine a plurality of changes to make to said first computer program wherein said analyzing includes the step of using an inference engine to apply said first plurality of rules to said intermediate symbolic representation; and d) generating a second computer program based upon said analysis of step c) which is fully compatible with said different second program environment.

* * * * *